United States Patent [19]

Sugita et al.

[11] Patent Number: 5,772,508

[45] Date of Patent: Jun. 30, 1998

[54] GAME OR PLAY FACILITIES CONTROLLED BY PHYSIOLOGICAL INFORMATION

[75] Inventors: Tohru Sugita; Tsutomu Ochiai, both of Maebashi, Japan

[73] Assignee: Amtex Co., Ltd., Kiryu, Japan

[21] Appl. No.: 554,568

[22] Filed: Nov. 6, 1995

[30] Foreign Application Priority Data

Sep. 28, 1995 [JP] Japan ................................... 7-274645

[51] Int. Cl.[6] ........................................ A63F 9/24
[52] U.S. Cl. ............................................. 463/36; 463/23
[58] Field of Search ................................. 463/23, 36–47

[56] References Cited

FOREIGN PATENT DOCUMENTS

| | | |
|---|---|---|
| 60-168480 | 8/1985 | Japan . |
| 4-325180 | 11/1992 | Japan . |
| 5-293253 | 11/1993 | Japan . |
| 6-134098 | 5/1994 | Japan . |
| 6-182055 | 7/1994 | Japan . |
| 6-296757 | 10/1994 | Japan . |
| 7-16349 | 1/1995 | Japan . |
| 7-16352 | 1/1995 | Japan . |
| 7-16353 | 1/1995 | Japan . |
| 7-16354 | 1/1995 | Japan . |
| 7-124331 | 5/1995 | Japan . |
| 7-148350 | 6/1995 | Japan . |
| 7-163758 | 6/1995 | Japan . |

*Primary Examiner*—Jessica Harrison
*Attorney, Agent, or Firm*—Oblon, Spivak, McClelland, Maier & Neustadt, P.C.

[57] ABSTRACT

A game or play facilities which change contents of progress of the game or play based on physiological information of a player, thereby being capable of providing contents suitable for the player. The game or play facilities is controlled by physiological information and includes physiological signal measuring device for measuring a physiological signal of a player, mental state determination means for determining mental state of the player by comparing the physiological signal subsequently to appropriate conversion thereof with reference values, and control means with reference values, and a control device determination by the mental state determination device.

17 Claims, 15 Drawing Sheets

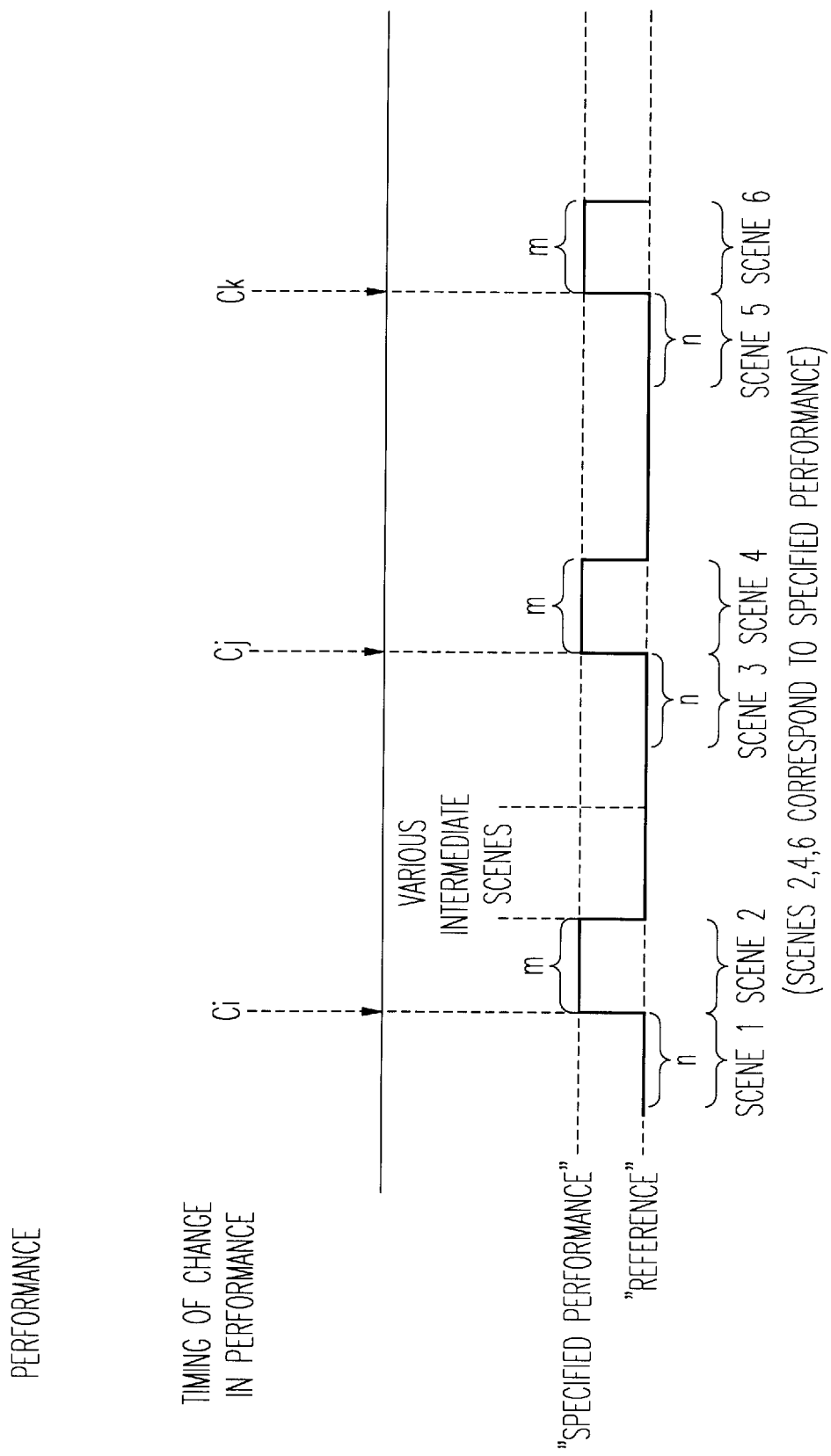

GAME OR PLAY FACILITIES CONTROLLED BY PHYSIOLOGICAL INFORMATION

BACKGROUND OF THE INVENTION

1. Field of the Invention

The present invention relates to games or play facilities controlled by physiological information. More specifically, it relates to games or play facilities which change a game progression based on physiological information of a player, thereby enabling game contents to be provided which are suitable for the player.

2. Description of the Background

As is well known, in a conventional computer game, the game proceeds as a player operates a keyboard joystick, mouse, or other key switch while viewing a picture or a display. In other words, the game proceeds according to input signals from the key switch or the like via intentional hand actions of a person.

Recently, some shooting or simulation games have been found which provide the player, prior to start of the game, with a choice for the degree of difficulty and the like, and which change a power of a confrontal character or a course of game progress according to the selected degree of difficulty.

However, even if difficulty and the like may be preliminarily selected, such conventional games based on a one-to-one correspondence between a person's intentional hand operation and game progress have difficulties described below.

For example, a psychological experience game, which introduces a player into virtual world of the game and gives the player various simulated psychological experiences can cause excessive mental stresses to the player when the actions evoked by his key operations are too realistic. The player cannot avoid such a situation since it is the result of the operation on the key switch or the like, and the player can suffer from psychological disorders even after quitting the game.

On the contrary, through repeated plays, when a player consecutively wins high scores or successfully arrives at the end of the game, the player often becomes accustomed to the game story and is not so excited with the contents which were intended to provide the player with surprise or the like. Therefore, good players lose interest in the game.

To cope with such situations, game experts have competitively devoted themselves to the development of games having more sophisticated and difficult contents. In such cases, many players, in particular beginners, cannot get high scores or are likely to lose the game in too short a period of time. For these reasons, the players often lose interest in the game.

SUMMARY OF THE INVENTION

The present invention addresses the above-mentioned difficulties in the conventional techniques. It is, therefore, an object of the present invention to provide a game or play facilities which change a progression of the game or play based on physiological information of a player, thereby providing contents suitable for the player.

A player's physiological signals (such as heart rate) can fluctuate over time according to physical conditions and uncontrollable environments, and these signals are likely to vary widely among individuals. Further, physiological information of a player includes a variety of contents and is not simply defined. Accordingly, it is very difficult to properly set physiological information with pre-defined reference values. Taking only the case of heart rate, since heart rate is essentially subject to fluctuation to some extent, if any change in heart rate from the last measured value is observed, it is not always clear whether the change is derived from a specific cause or not. In view of the fact, It is another object of the present invention to provide a game or play facilities in which the reference values and measures of such fluctuation are obtained from data on a player during play to facilitate initialization, and the reference values and the measures for mental state determination are automatically updated independently of individual differences in a player's physiological signals and a player's daily physical condition. Further, control signals are fed back during the game according to the progression of the game, thereby enabling reference values to be set which are appropriate and necessary for determination of a performance effect of the game.

It is a further object of the present invention to provide a game or play facilities in which heart rate in a specific performance and heart rate in a performance other than the specific performance are separately measured for determination, thereby enabling continuous check of the effect of the specific performance and comparison with another performance effect.

To attain the first object, there is provided according to the present invention a game or play facilities controlled by physiological information, the game or play facilities comprising:

physiological signal measuring means for measuring a physiological signal of a player, mental state determination means for determining a mental state of the player by comparing the physiological signal with reference values, and control means for controlling contents of game progress of the game or play based on the result of the determination by the mental state determination means.

According to the present invention, there is also provided a game or play facilities capable of expressing a plurality of sequences and/or plural levels of performance effects, the game or play facilities comprising:

physiological signal measuring means for measuring a physiological signal of a player, mental state determination means for determining a mental state of the player by comparing the physiological signal with reference values, sequence flow control means for controlling flow of the sequences of the game or play based on the result of the determination by the mental state determination means, and/or performance effect control means for controlling performance effect of the game or play based on the result of the determination by the mental state determination means.

According to the present invention, there is further provided a game or play facilities controlled by physiological information, the game or play facilities comprising:

physiological signal measuring means for measuring physiological information of a player, a physiological signal determination memory for directly or indirectly receiving the physiological information from the physiological signal measuring means to temporarily store the physiological information, physiological signal determination means for receiving physiological information from the physiological signal measuring means to compare the physiological information with the physiological information stored in the physiological signal determination memory, and executing a predetermined operation based on the result of the comparison, and for transmitting the resulting determination to performance effect control means, a performance effect control memory for temporarily storing the determination result transmitted from the physiological signal determination means, and performance effect control means for transmitting a signal to a computer for the game in game progress composed of sub-scenarios selected from a game scenario branched into various sub-scenarios based on the determination result transmitted from the physiological signal determination means and the determination result stored in the performance effect control memory, the signal indicating the performance effect to be next performed at a branch point subsequent to the currently proceeding game sub-scenario;

wherein the physiological signal determination means continuously measures physiological information of a player to collect heart beat intervals, and calculates per minute-heart rate from an inverse number of each of the measured heart beat intervals to use data of the per-minute heart rates from the last to nth-to-last values prior to the date to be next determined as data for reference values, and calculates representative values (such as average values) of the data and measures of variability (such as standard deviations) from the data values to compare the data values with heart rate and/or heart rate variability in a specific performance scene in the play, and determines current mental state of the player as "being excited or stimulated" when the heart rate exceeds a predetermined range, and as "being sober or cool" when the heart rate is below the predetermined range, and as "being unchanged or stable" when in the predetermined range, and transmits the result to the performance effect control means, and the performance effect control means changes progress of the game program based an the determination result of "being excited", "being stable" or "being cool".

BRIEF DESCRIPTION OF THE DRAWINGS

FIG. 17 is a time chart of performance effect control according to the fourth example of the present invention for controlling game progress based on physiological signals to attain timing-differentiated changes in performance.

DESCRIPTION OF THE PREFERRED EMBODIMENTS

Figure 1:
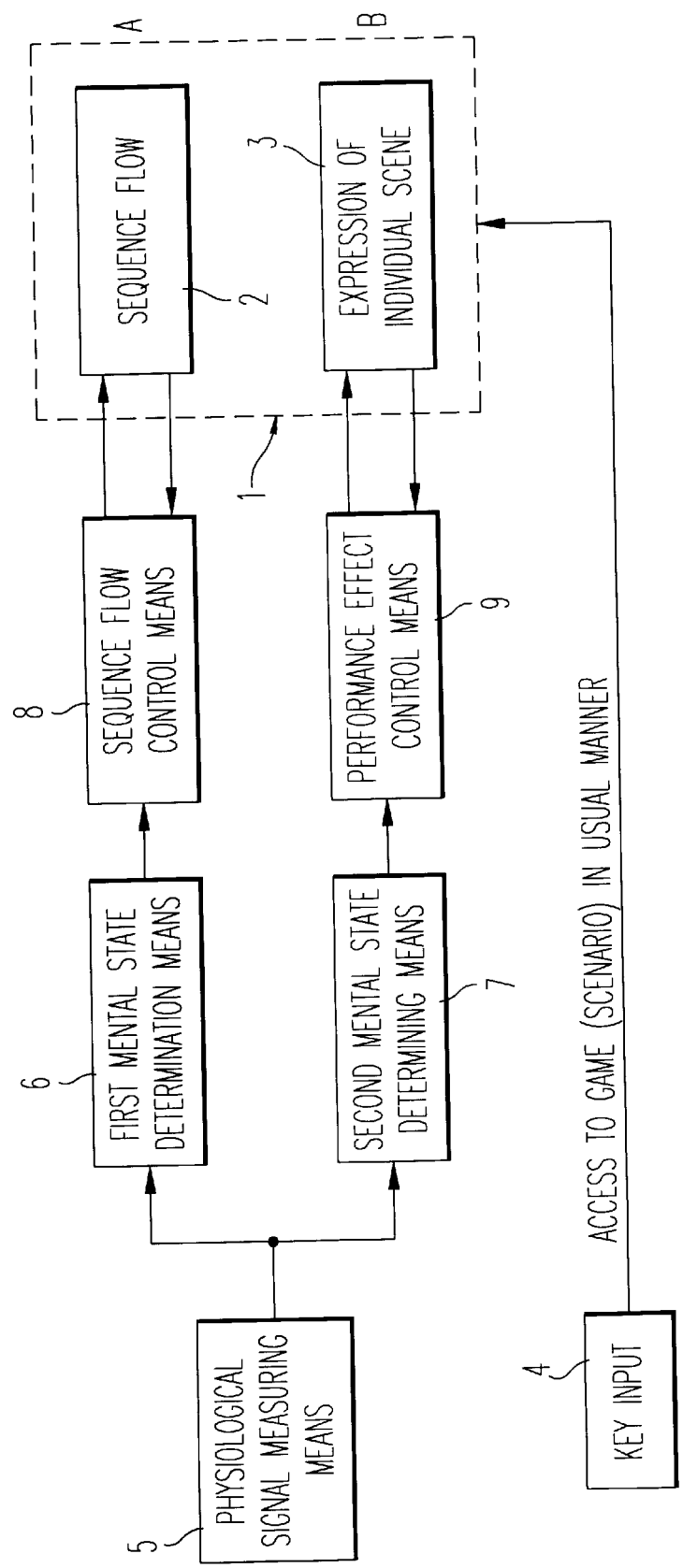
FIG. 1 is a block diagram showing one mode of execution of the game according to the present invention.

FIG. 1 shows an example of a psychological experience game (which introduces a player into a virtual world of a game and gives the player various simulated psychological experiences) which uses a player's heart rate as physiological signal. Game scenario (1) is capable of expressing multiple sequences (2) and multiple levels of performance effects (3). A player's input (4) is via a mouse or joystick, or other input determined by a player's actions. This input 4 determines specific sequence elements, which in turn determine the corresponding performance effects. This is the same mode as in conventional psychological experience games. Physiological signal measuring means (5) is a heart rate device for detecting a physiological signal of the player. First mental state determination means (6) determines a mental state of the player. Second mental state-determination means (7) is substantially the same as the first mental state-determination means (6). Sequence flow-control means (8) control a flow of the game sequence based on the results of determination by the first mental state-determination means (6). Performance effect-control means (9) controls effects based on the result of determination by the second mental state-determination means (7). These elements constitute an example of a psychological experience game according to the present invention. Herein, a "sequence" corresponds to a section of the scenario.

Figure 2:
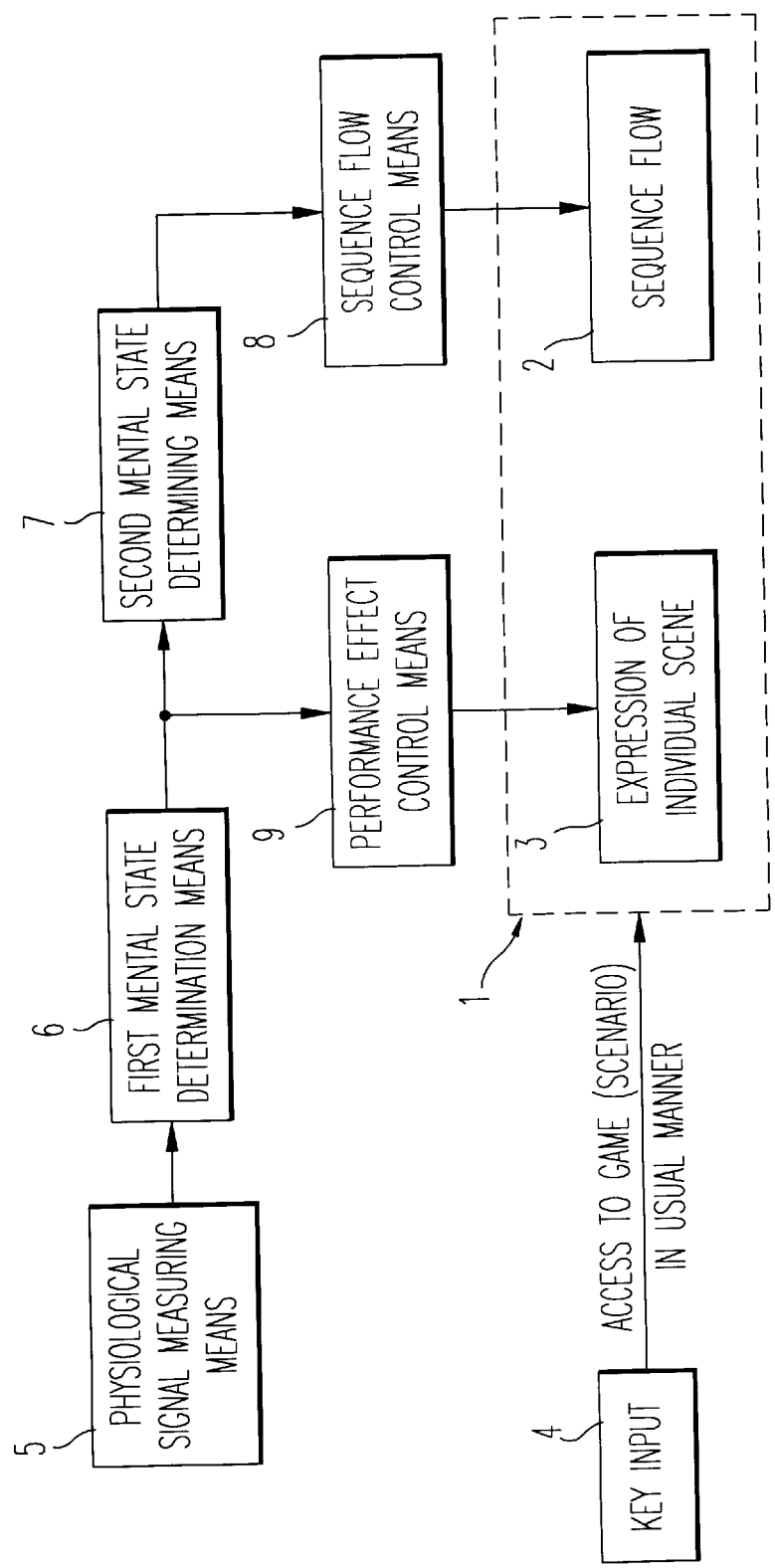
FIG. 2 is a block diagram showing another mode of execution of the game according to the present invention.

In the example shown in FIG. 1, the sequence flow-control means (8) and the performance effect-control means (9) are independently controlled by using the first and second mental state-determination means (6) and (7) in parallel. It is, however, to be noted that the present invention is not limited to this particular example. For example, as shown in FIG. 2, the second mental state-determination means (7) may be so arranged as to store and analyze the results of determination by the first mental state-determination means (6).

Further, games according to the present invention are not limited to the above arrangements. For example, control may be applied to either the sequence flow of a game or the performance effect, or means may be employed for detecting different kinds of physiological signals.

In the psychological experience games according to the present invention as described above, a heart rate of the player is determined by the physiological signal-measuring means (5), and based on the determined heart rate, optimal sequence elements and performance effects for the player are determined by means of the first and second mental state-determination means (6) and (7), and the sequence flow-control means (8) and the performance effect-control means (9). The constituent elements will be described below in more detail.

As the heart rate-measuring device as physiological signal measuring means (5), a conventional device may be used. In this connection, when such a device is incorporated into a key input device such as a mouse or joystick, it does not hinder to play or complicate configuration.

Figure 3:
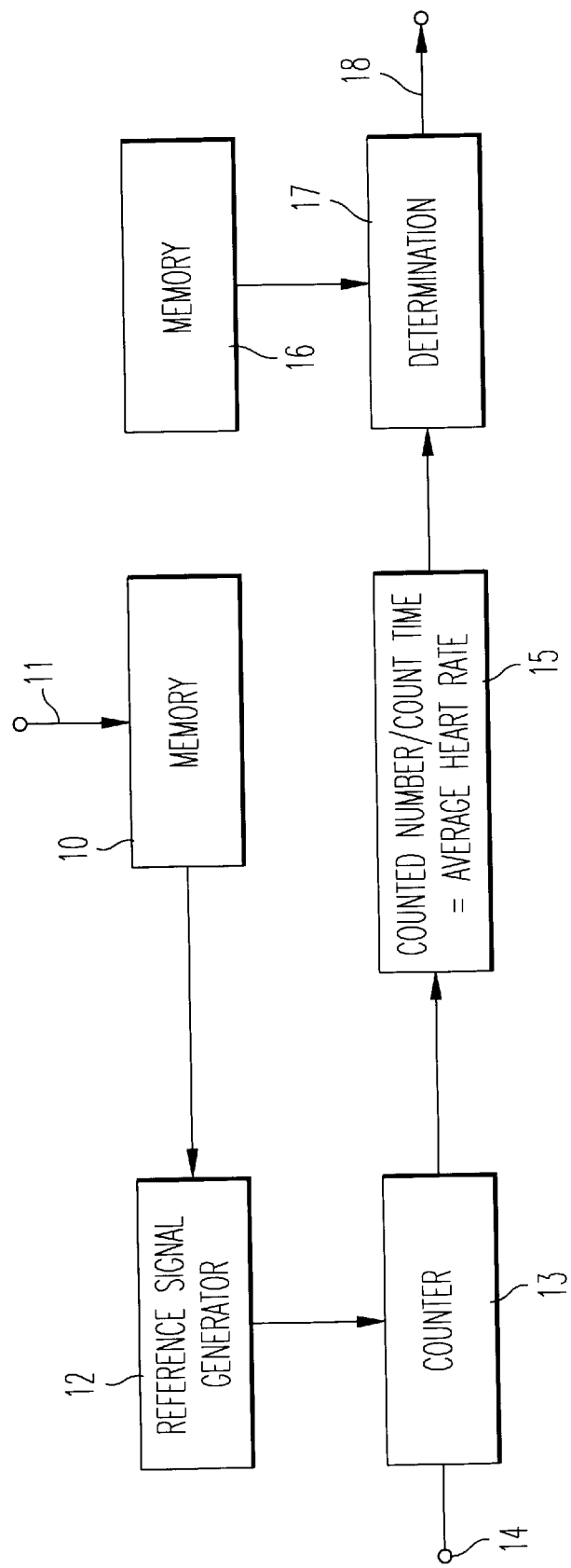
FIG. 3 is a block diagram showing an example of the first mental state determination means used in the present invention.

The output of the physiological signal-measuring means (5) is fed to the first mental state-determination means (6), where mental state of the player for a relatively long period is determined. In other words, as shown in FIG. 3, in the first mental state-determination means (6), count time and timing of the count for determining mental state of the player (11) are written in a memory (10) according to a game program, and based on the timing, the memory (10) actuates a counter (13) via a reference signal generator (12) to count signals (14) from the heart rate-measuring device (5), and an average heart rate-calculating unit (15) calculates the average heart rate (HR) based on the count time from the game program and the counted number, and a determination unit (17) compares this average heart rate with reference values (HR0, HR1, ...) preliminarily stored in a memory (16) and then outputs a determination signal (18).

Change in the average heart rate for a relatively long period is considered to indicate change in mental state such as degree of player's excitement in the specified sequence, i.e., during the lapse of the specified period of time. Therefore, a value considerably lower than any of the pre-defined reference values indicates that the player is not so excited in the specified sequence. Conversely, a value remarkably higher than any of the pre-defined reference values indicates that the player is excessively excited in the specified sequence. Accordingly, the determination signal obtained by the comparison between the average heart rate and the reference values can be used In determination of the most suitable sequence element for the player.

The reference values may be set by the player or pre-defined by the game program.

Figure 4:
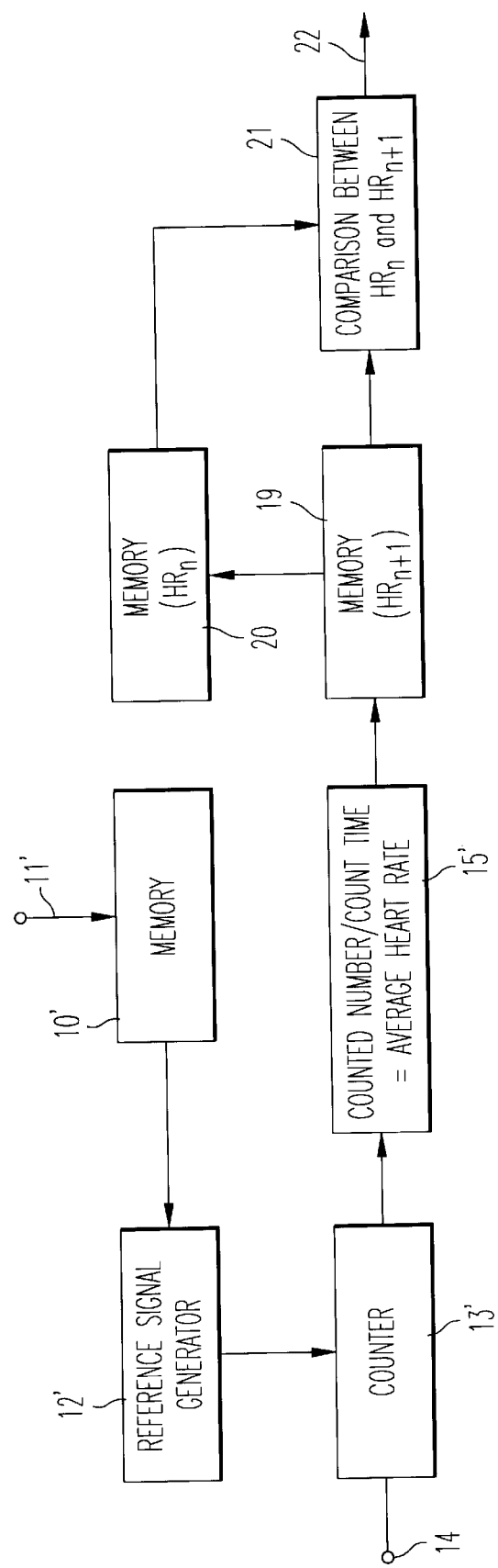
FIG. 4 is a block diagram showing an example of the second mental state determination means used in the present invention.

The output of the heart rate-measuring device (5) is fed also to the second mental state-determination means (7), where the player's mental state for a relatively short time period (for example, several seconds to 1 minute) is determined. In other words, as shown in FIG. 4, in the second mental state-determination means (7), count time and timing of the count and number of times of the count for determining mental state of the player (11') are written in a memory (10') according to game program, and based on the timing, the memory (10') actuates a counter (13') via a reference signal generator (12') to count signals (14') from the heart rate-measuring device (5'), and an average heart rate-calculating unit (15') calculates the average heart rate (HR) based on the count time from the game program and the counted number, and the average heart rate is stored in first memory (19) as average heart rate at that moment (HRn), and when the next average heart rate HRn +1) is calculated, the first memory (19) feeds the stored average heart rate value (HRn) to a second memory (20), and a comparison unit (21) compares the contents of the first and second memories (19, 20) and then outputs a determination signal (22).

In the comparison unit (21), it is preferable to compare the average heart rate with the maximum and minimum heart rates of the preliminarily defined heart rates to confirm that the average heart rate falls between the latter two values. It is thereby possible to consider the performance effect to be excessive when the average heart rate exceeds the maximum heart rate, or to consider the heart rate-measuring device (5) to be not in operation when the average heart rate is lower than the minimum heart rate. It is thus possible to interrupt the game or to give the player an indication for calling player' attention, according to the situations.

The average heart rate for a relatively short period is considered to indicate mental state of the player such as fear, surprise or relaxation caused by individual performance effects. For example, a player who is subjected to performance effect intended to give fear is likely to feel fear as a general rule, and accordingly, if the player's heart rate does not change, the performance effect at the time is considered to be insufficient for the player. Specifically, for a performance effect intended to give fear, if the average heart rate shows decrease or no change as compared with the proceeding measurement, the player does not feel fear or surprise, contrary to the aim of the performance effect. On the other hand, if the average heart rate exceeds that obtained by the proceeding measurement within a predetermined extent, the player is responding to the performance effect as intended. Thus, the determination signal obtained by comparing the contents of the first and second memories (19 and 20) can be used in determining the most suitable performance effect for the player.

Of course, excessive excitation or the like can be dangerous for the player. Therefore, an upper limit of the heart rate at the time of measurement for the performance effect may be stored in the comparison unit (21). Of course, for example, when a performance effect is intended to give relaxation, the average heart rate is likely to be substantially the same as or lower than that obtained by the proceding measurement as a general rule.

Performance means in a game comprises various graphic images and sounds, and suitable sets of graphics and sounds are determined according to the level of performance effect. Performance means by graphic images include adjustment of image sharpness by mosaic, screen or fuzzing effect, change in image contents by scary or entertaining images, adjustments of image movement and character numbers and appearance frequencies such as moving speed and direction of characters, enlargement/reduction, appearance/disappearance. Performance means by sounds include effective sounds, voices and music.

Figure 5:
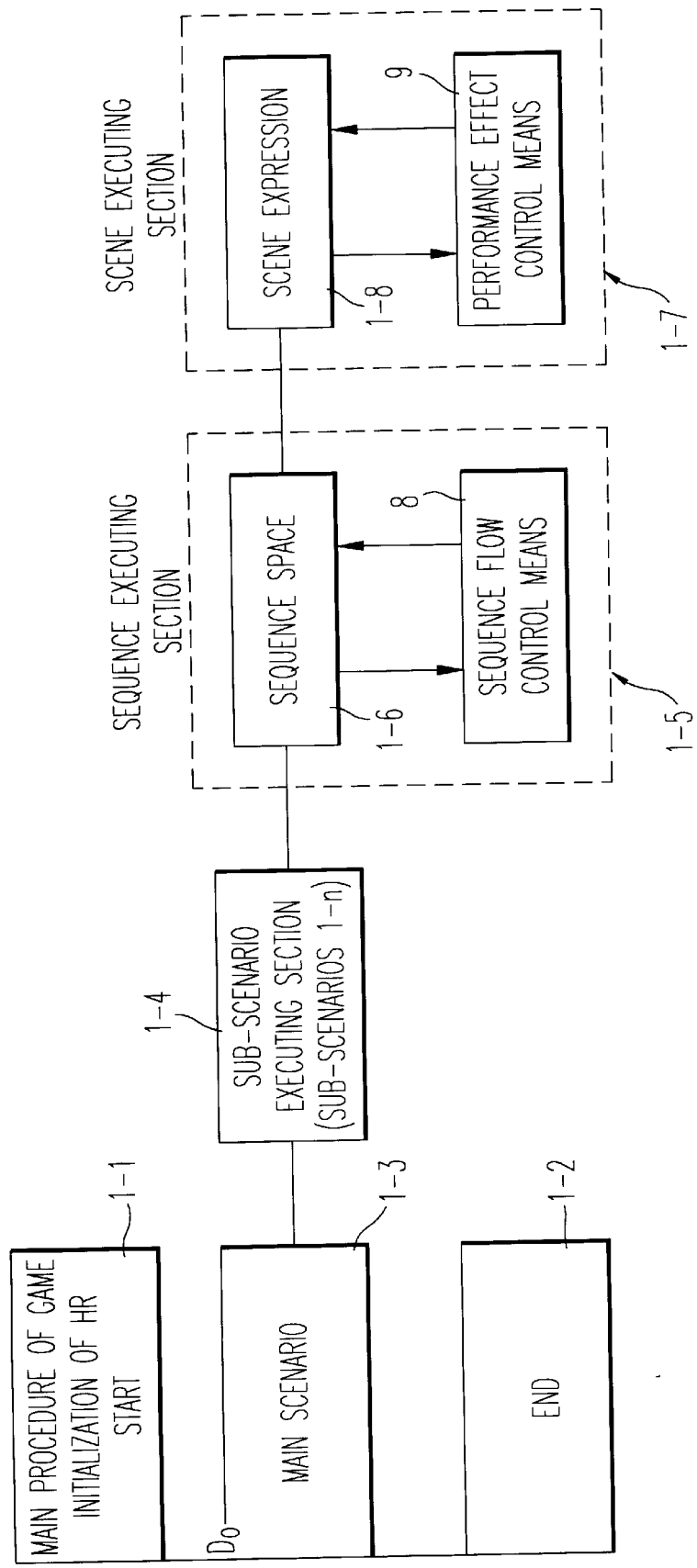
FIG. 5 is a block diagram showing one mode of development of the game according to the present invention.

A psychological experience game controlled by the two types of determination signals obtained as described above will be described. For example, as shown in FIG. 5, initialization is first performed in a main procedure of the game (1—1), where a reference heart rate (HR0) is determined. Of course, this may be done by direct input of a heart rate. However, additional factors such as age and sex of a player may be input. Further, the reference heart rate may be determined according to age, sex and the like.

At the start of the game, the game's main scenario (1-3) progresses up to the ending (1-2). In this procedure, sub-scenarios (1-n), are executed in a sub-scenario executing section (1-4) correspondingly to specified parts of the main scenario (1-3). In a sequence executing section (1-5), sequence flow executed in a sequence space (1-6) is controlled by sequence flow controlling means (8). In a scene executing section (1-7), corresponding to individual sequence elements, performance effects of scenes expressed by a scene expression (1-8) are controlled by performance effect controlling means (9).

Figure 6:
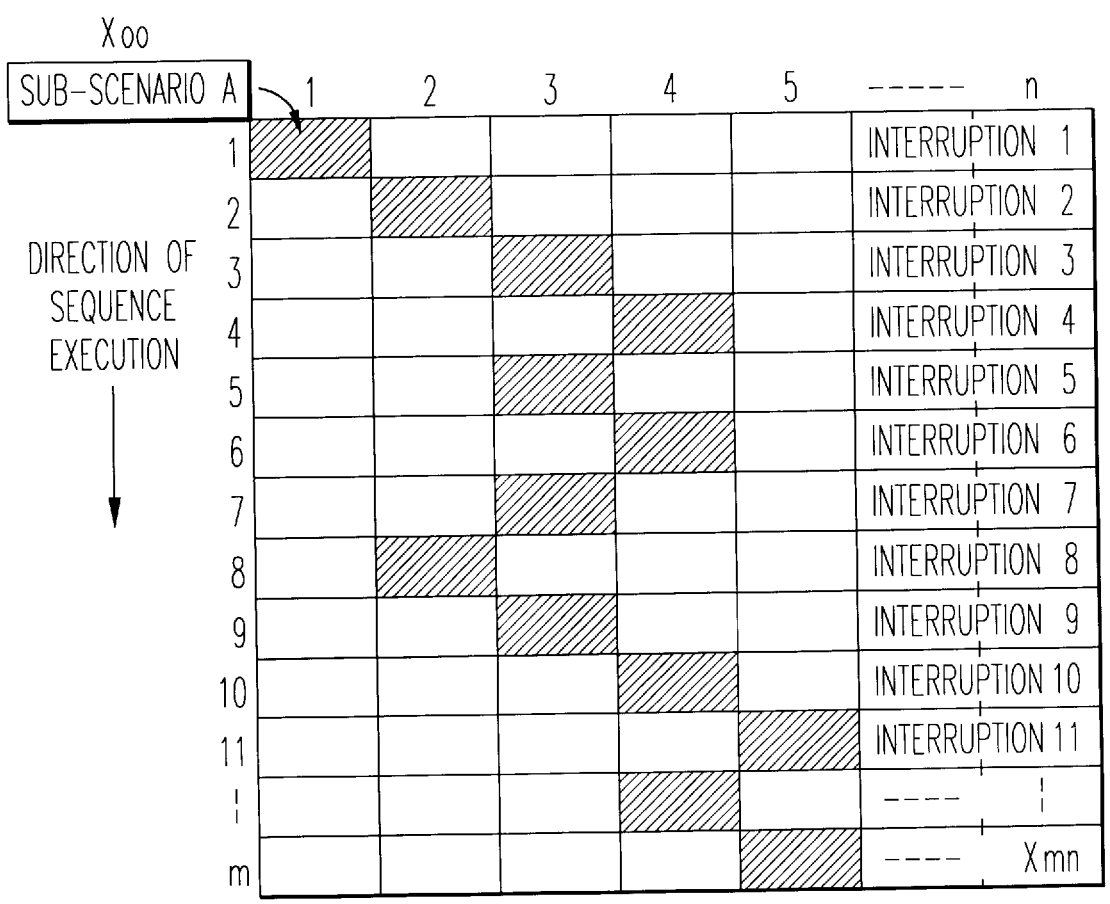
FIG. 6 is a block diagram showing an example of the sequence space used in the present invention.
Figure 7:
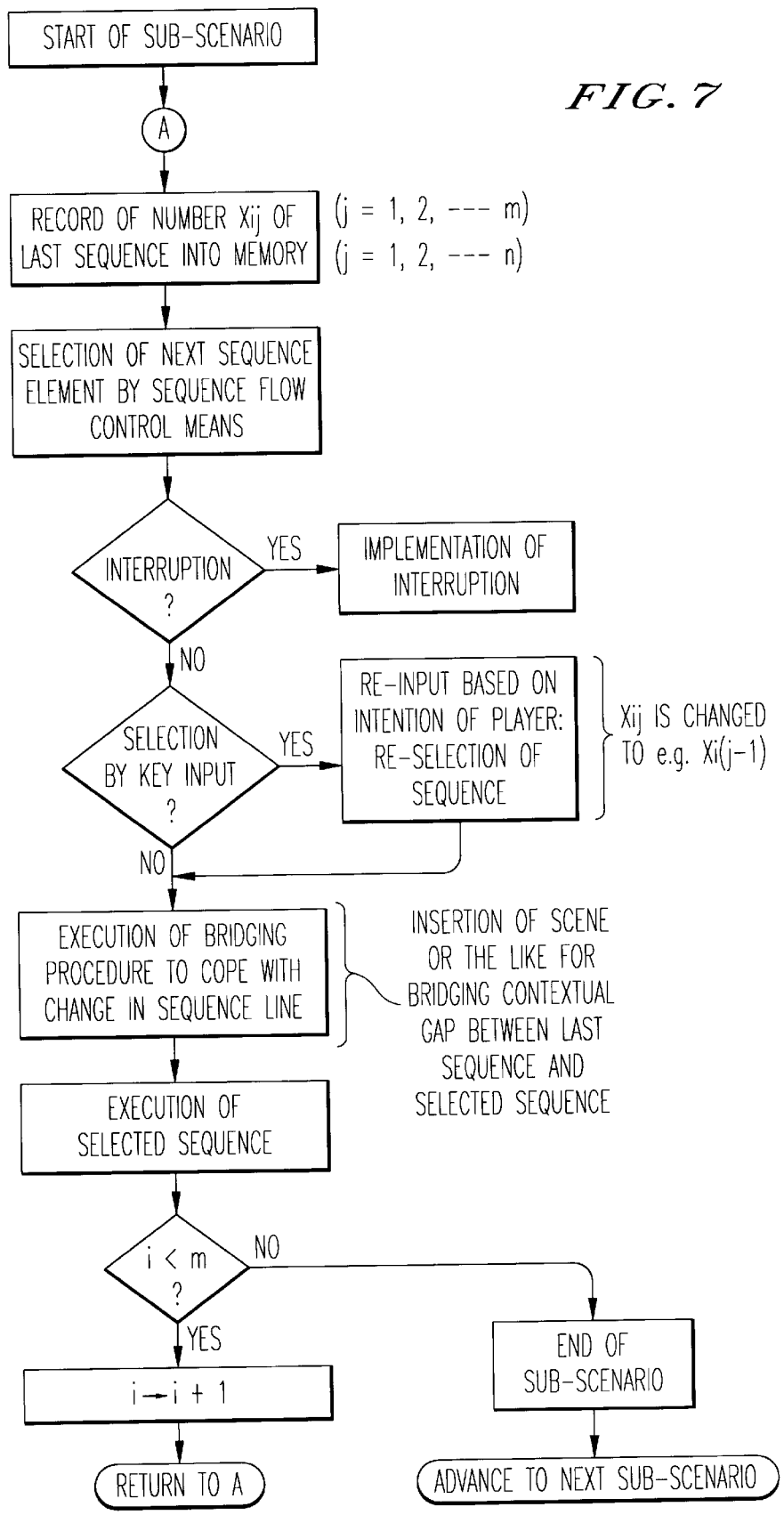
FIG. 7 is a block diagram showing an example of the sequence executing section used in the present invention.

The sequence executing section (1-5) will be described more specifically. For example, when a sub-scenario A starts in a sequence space composed of m×n sequence elements of from X11 to Xmn as shown in FIG. 6, the last sequence element number (eg., X00 in FIG. 6) is first stored in a memory, and then the subsequent sequence element is determined by the sequence flow controlling means (8) (eg., X11-X22-X33-X44-X55 in FIG. 6). In this connection, if the determined sequence element indicated to interrupt the game, interruption is effected in response thereto.

This example is adapted to be such that a player may select, through key input or the like, a sequence element other than that determined as above, thus providing more suitable game contents for the player. It Is, of course, possible to permit any sequence elements to be selectable, or to put some limitations on the selection.

In implementation of a selected sequence, if an inconsistency with the foregoing story is caused as a result of sequence selection (for example, in FIG. 6, if X61 is selected as a next sequence element in a story which has been progressing as X11-X22-X33-X44-X55, and is contextually inconsistent with X55), it is preferred to take appropriate measures (such as insertion of a scene or restriction of the selection of the subsequent sequence) to render the preceding sequence and the currently selected sequence contextually consistent with each other.

When the selected sequence element is implemented, the sub-scenario returns to the start A. This is repeated up to the line of the last sequence elements Xm. After execution of a sequence element in the line of the last sequence elements Xm, the game proceeds to the next sub-scenario.

Of course, to the games constructed as described above, player's key inputs through mouses or joysticks are fed.

In the present invention, a determination signal generated by the first mental state-determination means (6) is fed to the sequence flow-controlling means (8), and a determination signal generated by the second mental state-determination means (7) is fed to the sequence flow-controlling means (9), thus providing sequence elements and performance effects most suitable for the player. In this process, for example, the sequence flow-controlling means (8) functions as described below.

Figure 8:
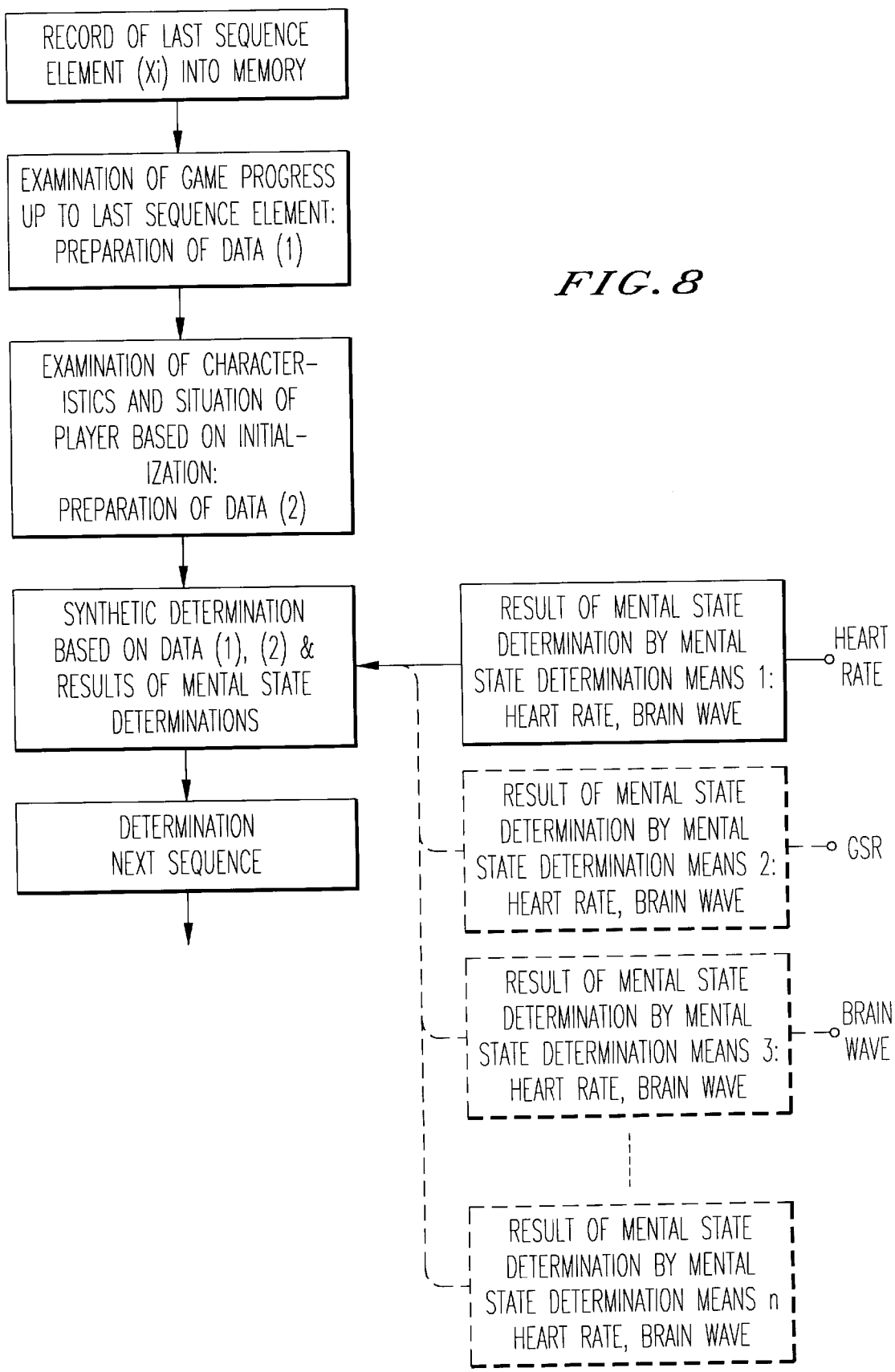
FIG. 8 is a block diagram showing an example of the sequence flow control means used in the present invention.

As shown in FIG. 8, the last sequence element is first stored in a memory, and then the foregoing game progress is examined to prepare data (1). This data includes elapsed time from the start of the game, elapsed time from start of the last play, the entire foregoing progress of the game, and progress after the last play.

Next, characteristics and situation of the player are examined based on the initialization of the game to prepare data (2). This data include sex, age, number of times passing the game, current time, detected value immediately after wearing a physiological signal detection device used. Incidentally, for example, a current time can be input automatically by providing a built-in clock circuit.

On receiving the determination signal from the first mental state determination means (6), the next sequence is finally determined based on comprehensive evaluation of data (1) and (2).

As previously described, the determination signal by the first mental state determination means (6) indicates that the player is not so excited or is excessively excited, in the current sequence. Accordingly, if the player is not considered to be excited enough based on the determination signal from the mental state determination means (6) and the data (1) and (2), a more exciting sequence is selected. On the other hand, if the player is considered to be excessively excited, an excitement-repressive sequence is selected. Thus, the sequence element most suitable for the player is determined.

When the player is too strongly excited, it is preferred to give a warning and then suspend the game, or to skip the sequence, or to return to the start, or to quit the game.

Further, as shown in FIG. 8, use of a plurality of means for determining mental state as the first mental state-determination means (6) enables providing more accurate control.

Figure 9:
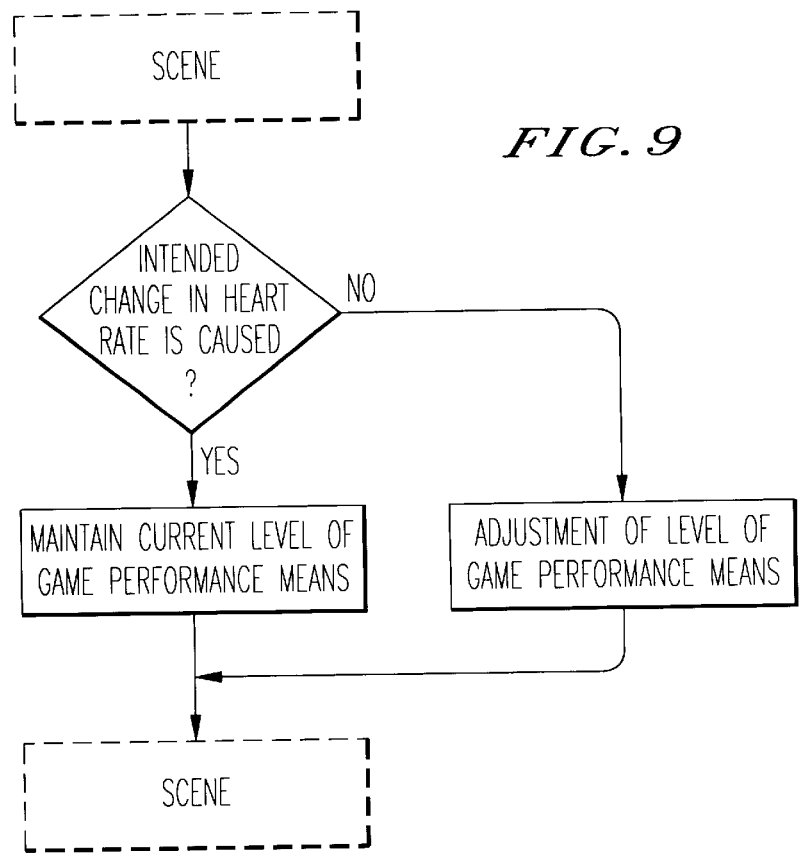
FIG. 9 is a block diagram showing an example of the performance effect control means used in the present invention.

On the other hand, the performance effect-controlling means (9) functions, for example as follows. In a scene providing specified performance effect, as shown in FIG. 9, the performance effect-controlling means (9) receives a determination signal from the second mental state-determination means (7) to determine whether the current performance effect should be continued or changed. Hereupon, progress is made to the next scene.

As previously described, the determination signal from the second mental state-determination means (7) is considered to indicate changes in player's mental state, such as fear, surprise, or relaxation with respect to individual performance effects. For example, if a player's mental state is not affected by performance effect intended to cause fear, the player does not feel fear, surprise or the like by the performance effect contrary to the aim of the performance effect. If the player's mental state is changed in a predetermined range, the player is responding to the performance effect as intended. Thus, the determination signal from the second mental state-determination means (7) can be used in determining the performance effect most suitable for the player.

The performance effects can be further delicately controlled. For example, as in the above-described case, when performance effect intended to provide fear does not cause change in player's mental state, the performance effect may be switched to another performance effect adapted to provide enhanced fear. Specifically, for example, a supporting character or a new character such as a so-called "extra" may be introduced to create the situation of surrounding the player and the like.

Figure 10:
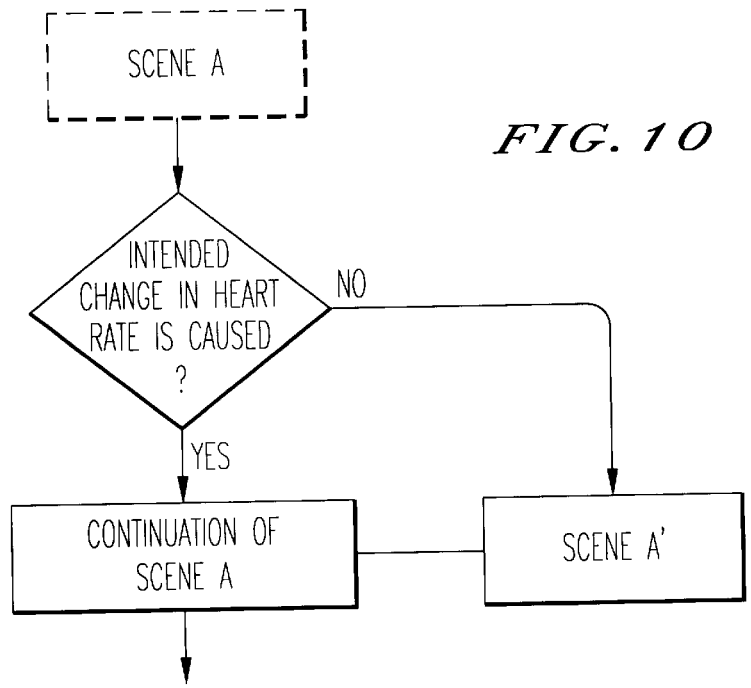
FIG. 10 is a block diagram showing another example of the performance effect control means used in the present invention.

The above-described modified performance may be realized as follows. For example, as shown in FIG. 10, when an intended change is not attained, scene A is interrupted and switched to scene A' where the above-mentioned supporting character or extra character-appears, and then the scene A Is resumed. If the scene A' also falls to attain the intended effect, the scene A' is switched to still another scene A" (not shown) adapted to provide further enhanced performance effect.

In the above-described example, the heart rate-measuring device is used as physiological signal detection means. However, the heart rate-measuring device in the present invention is not limited thereto, and other signals such as pulse waves, blood pressure, skin perspiration, epidermal vibration, and brain waves may be used as physiological signals. When skin perspiration or pulse waves are used for this purpose, measurements may be converted according to the physiological signal used by, for example, subjecting the measurements to A/D conversion or converting the measurements into pulses to feed the result the to mental state-determination means.

Figure 11:
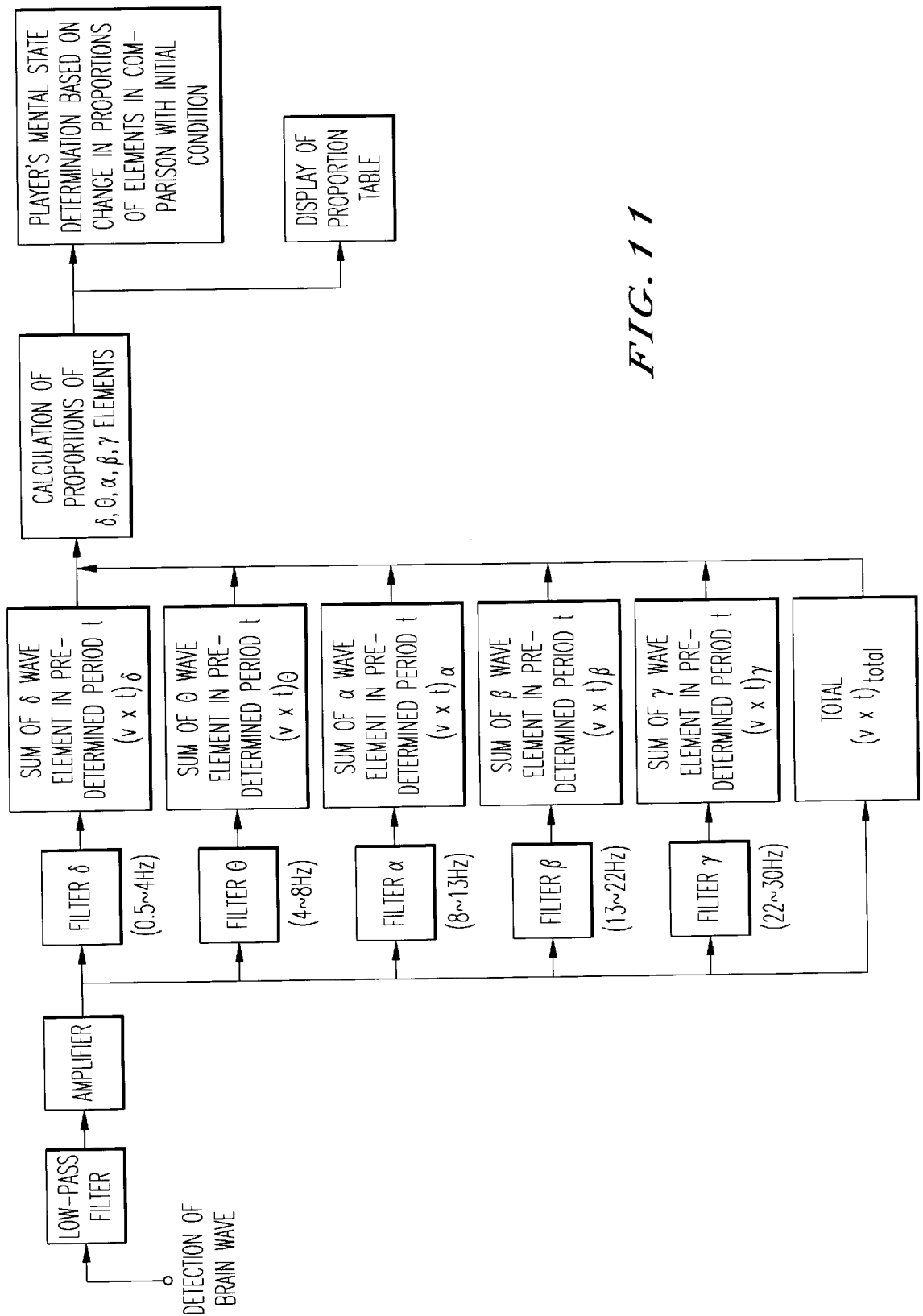
FIG. 11 is a block diagram showing an example of the physiological signal measuring means utilizing brain waves.

When brain waves are used, as shown in FIG. 11, detected brain waves are filtered through a low-pass filter, and then amplified, and filtered through a filter for each type of brain waves, and then sum of each type of brain waves in a predetermined period is calculated to form products of voltage and time to give a content of each type of brain waves. The results are compared with, e.g, initial values to determine the mental state of the player. The content of each type of brain wave is displayed according to need.

Although the example is concerned with psychological experience games, the present invention is, of course, applicable to other types of game utilizing player's mental state as important factor, and can be applied further to play facilities capable of expressing multiple sequences and multiple levels of performance effects.

Specifically, an amusement park or the like generally provided with play facilities (e.g., a horror house) where players travel on foot or by electric vehicle through courses preliminarily provided with scenes and characters for arousing fear or amusement, and the present invention is applicable to such facilities. For example, in such facilities, the courses of travel are so constructed as to be changeable by external control thereby defining a plurality of zones divided at change points. The scenes, and number/arrangement of the characters, appearance/disappearance thereof are rendered changeable. The plurality of zones are regarded as "sequences" in the above-described example of game, and the scenes, number/arrangement of the characters, and appearance/disappearance thereof are regarded as "performance effects" in the example, and at the same time, physiological signals are wirelessly received to control the courses of travel. In this way, for example such "sequences" and "performance effects" that have not been able to arouse children's fear so much in a conventional horror house can be provided as "sequences" and "performance effects" which can arose enhanced fear to adults.

Now, the second example of game or play facilities controlled by physiological signals according to the present invention will be described with reference to the drawings.

The second example is concerned with game or play facilities in which player's physiological signal (heart rate) affects the progression of the game, the results are fed back at one scene of the game for comparison with the last measured player's physiological signal. In his way, physiological signals are evaluated according to characteristics of individual players and various situations, thus providing the physiological information-controlled game or play facilities capable of more accurately controlling the game in real time, and more appropriately controlling the play according to the situations.

In other words, in the first example, physiological signals such as heart rate measured at predetermined intervals are compared with the pre-defined reference value or the last measured value by means of the mental state-determination means to determine a change in excitement level in real time. Physiological signals such as heart rate, however, fluctuate over time according to physical conditions and uncontrollable environments, and they are likely to vary widely among individuals. Further, physiological information of a player includes a variety of contents and is not simply defined. Accordingly, it is very difficult to properly set physiological information with pre-defined reference values.

Since heart rate is essentially subject to fluctuation to some extent, if any change in heart rate from the last measured value is observed, it is not always clear whether the change is derived from a specific cause or not.

To cope with this, in the second example, the reference values and measures of such fluctuation are obtained from data on a player during play to facilitate Initialization. In addition, the reference values and the measurements for mental state determination are automatically updated independently of individual differences in a player's physiological signals and a player's daily physical condition. Further, control signals are fed back during the game according to the progression of the game, thereby enabling reference values to be set which are appropriate and necessary for determination of a performance effect of the game.

Figure 12:
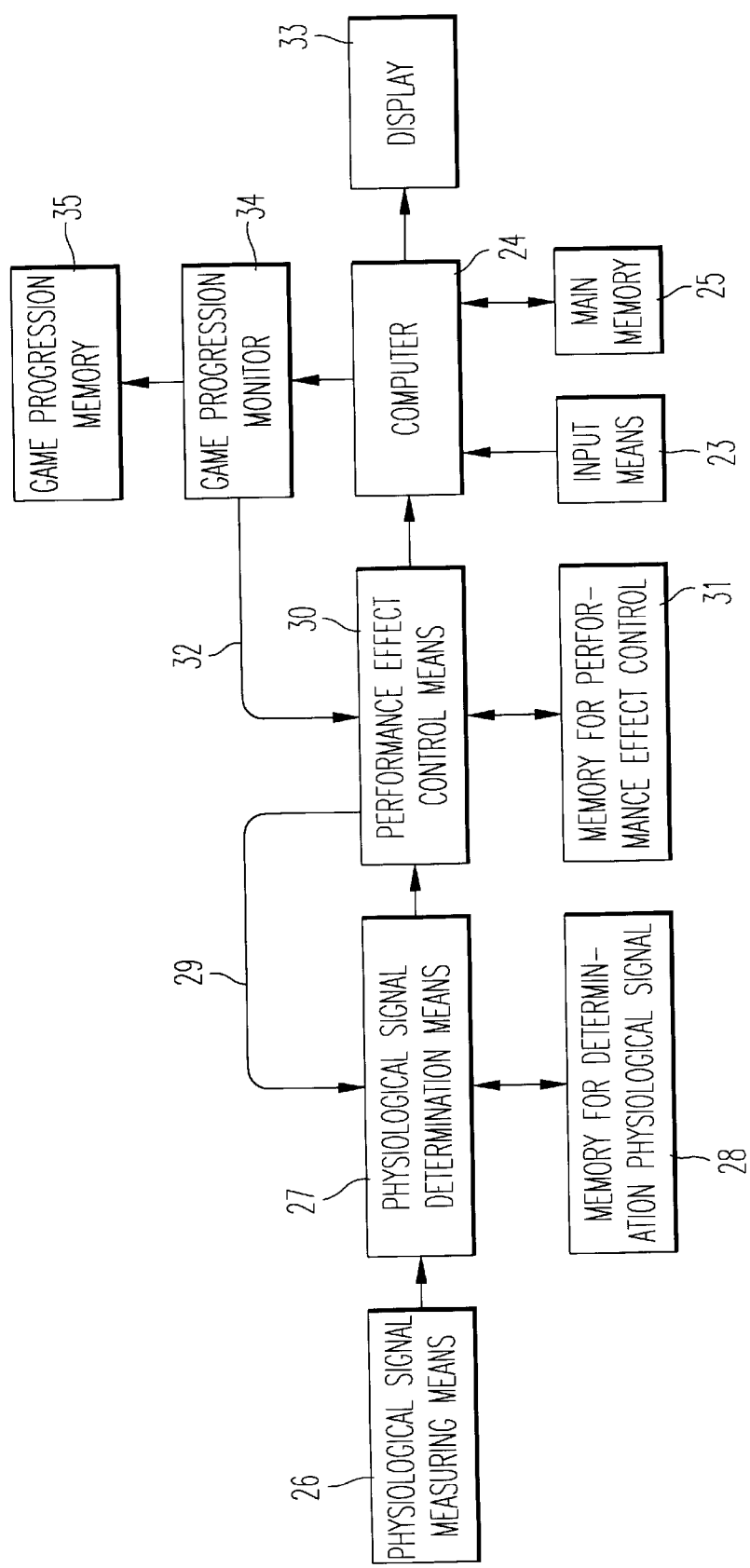
FIG. 12 is a block diagram showing the structure of the game controlled by physiological information according to the second example of the present invention.

The game or play facilities controlled by physiological information according to the second example has a structure as schematically shown in FIG. 12. In other words, the structure comprises input means (23) corresponding to the key input (4) in the first example, physiological signal-determination means (27) corresponding to the first and second mental state-determination means (6, 7) in the first example, and performance effect controlling means (30) which performs substantially the same control as the sequence flow controlling means (8) and the performance effect controlling means (9) in the first example.

The input means (23) controls starting and progression of the game, and with respect to physiological signals detected by the physiological signal measuring means (26), significance of variation in the physiological signals is determined in the physiological signal determination means (27). That is, it is determined, for example, whether the variation is a result of fluctuation inherent in a player or a result caused by the game. Based on the determination, the performance effect controlling means (30) controls the progression of game scenario (game program).

For this purpose, a memory (28) for the determination of physiological signals is connected to the physiological signal determination means (27). Physiological information on the player based on the physiological signals detected by the physiological signal measuring means (26) is stored in this memory in combination with information on a performance period. The information is processed in accordance with the operation as described below to obtain a determination.

A memory (31) for controlling a performance effect is connected to the performance effect controlling means (30). In this memory are preliminarily stored, in the form of specific parameters, the determination by the physiological signal determination means (27) and control commands to select a course from a wide choice of courses contained in the game scenario based on the determination. Then, from game progression monitor (34), information on the last performance conditions, which is a signal to be fed back via first condition signal line (32), is send to the performance controlling means (30) as a first condition signal The game progression monitor (34) is to store the history of player's conditions during game progression performed on a display (33), and is adapted to be capable of indicating one or more conditions required for the game progression. For example, it enables indicating current position in the game scenario, confirming current performance conditions, or changing game characters. In this example, the indicated information is also stored in a game progression memory (35).

In this example, game program (1) to be executed, which has been stored, e.g., in an external storage device (not shown) such as a read only memory, hard disk or the like, is stored in a main memory (25) to progress the game on a computer (24) interactively with the player.

Namely, in this example, the game program (1) stored in the main memory (25) is executed to progress the game based on the information determined by the physiological signal measuring means (26), the physiological information determination means (27) and the performance effect controlling means (30), or by player's input via the input means (23). The player plays the game while sensing performance effects and characters performance following the course of the game by watching the progress of the game on the display (33) which is a CRT display, liquid crystal display or the like.

Figure 13:
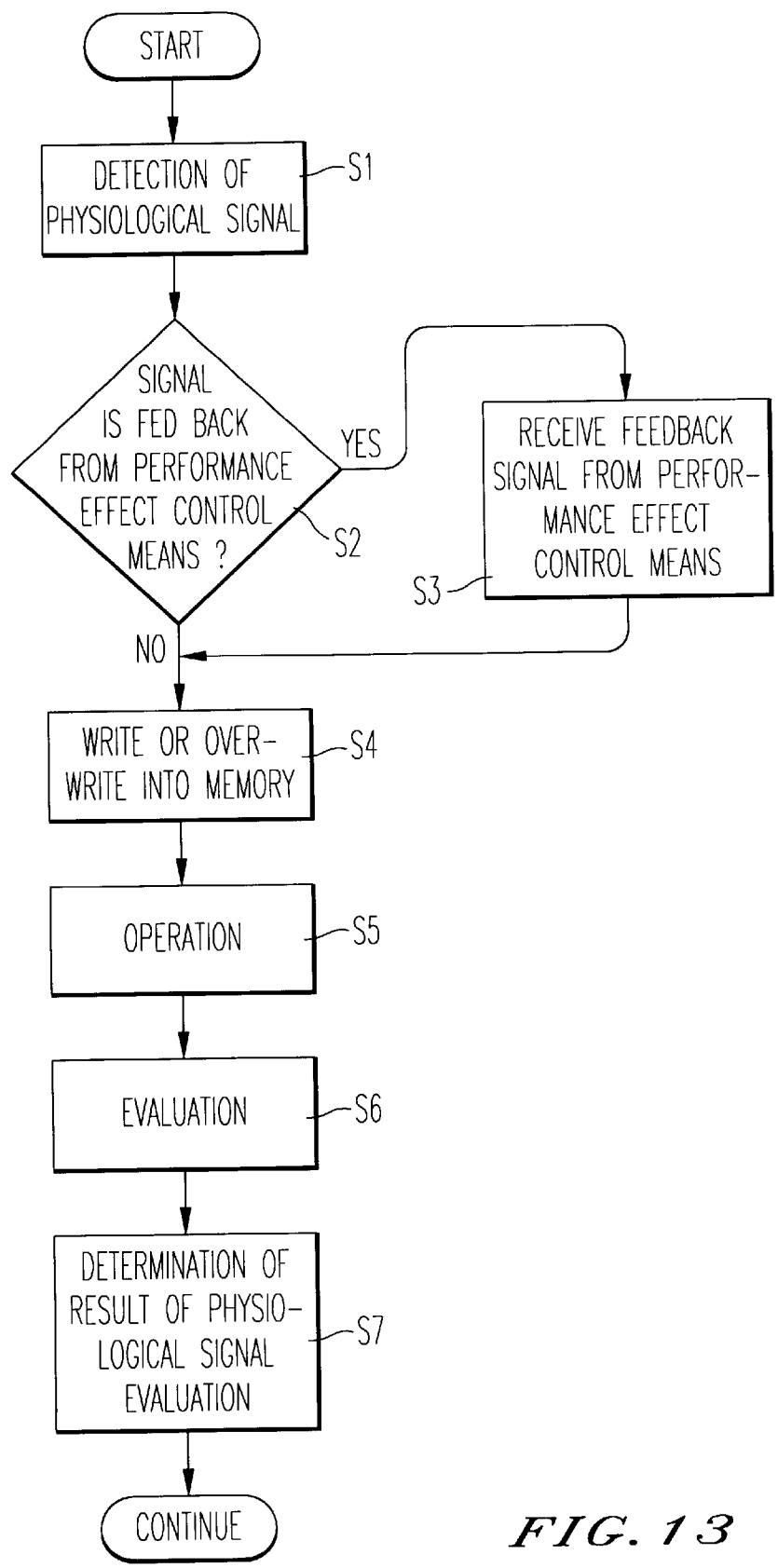
FIG. 13 is a flow chart showing determination procedure in the physiological signal determination means according to the second example of the present invention.

Next, an example of a method for determining and controlling a physiological signal will be described on the game or play facilities having the above-described structure and controlled by physiological information means at a play facility with reference to FIG. 13.

First, a player inputs the game program (1) to be executed, starting commands necessary for executing the game and the like through the input means (23). The computer (24) receives player's input signal and, in response to the signal, transfers the selected game program (1) from the external storage device to the main memory (25) to run the game program (1) (see FIG. 12).

Upon start of the game program (1), the physiological signal measuring means (26) starts detection of physiological signals such as player's heart rate. As shown in FIG. 13, player's physiological signal such as player's heart rate or heart-beat interval is detected and transmitted to the physiological signal determination means (27). If no signal is detected for a certain period, a "warning message" is output, and determination that no physiological signal is detected is made to proceed to the next scenario (Step S1).

The physiological signal determination means (27) receives physiological signals from the physiological is measuring means (26) (Step S2), and checks if second status signal has received in consequence of feedback from the performance effect controlling means (30). If received, the physiological information determination means (27) modifies the last n values of heart rate with the last performance effects based on the received second status signal, and changes the structure of the memory (28) according to the contents of signal (n, m) (Step S3).

The physiological signal determination means (27) writes (or overwrite) information based on the physiological signal from the physiological signal measuring means (26) into the memory (28). If the second status signal has been received, information based on the second status signal (M) is written (or overwritten) into the physiological signal determination memory (28) (Step S4). At the same time, the physiological signal determination means (27) executes predetermined operation based on the written physiological signal information (Step S5).

Figure 14:
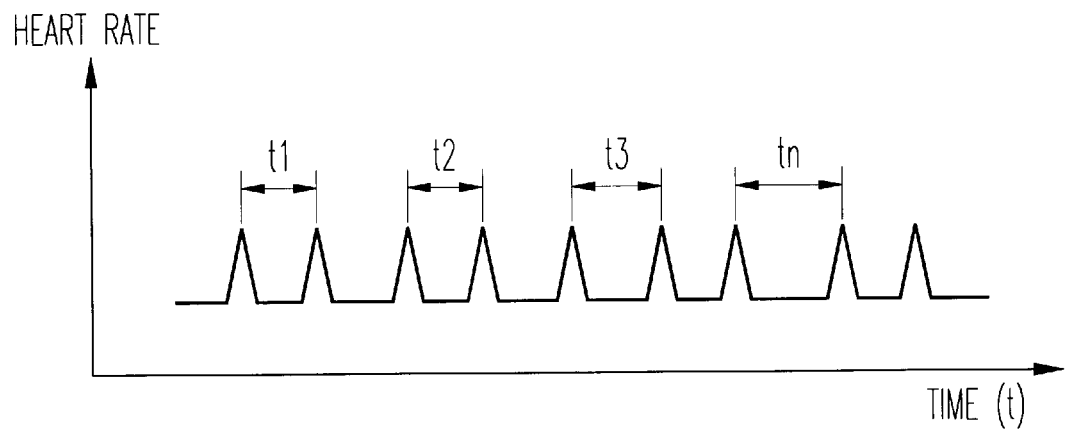
FIG. 14 is a graph showing timing for measurement of physiological signals in the second example of the present invention.
Figure 15A:
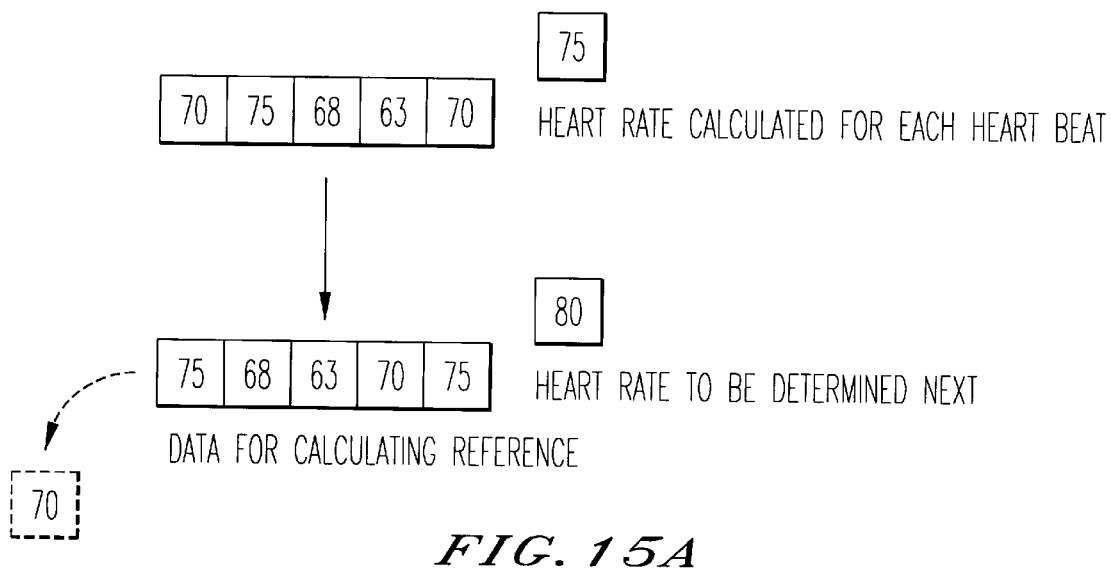
FIG. 15(a) is a conceptional representation of determination of measured heart rates in the second example of the present invention.
Figure 15B:
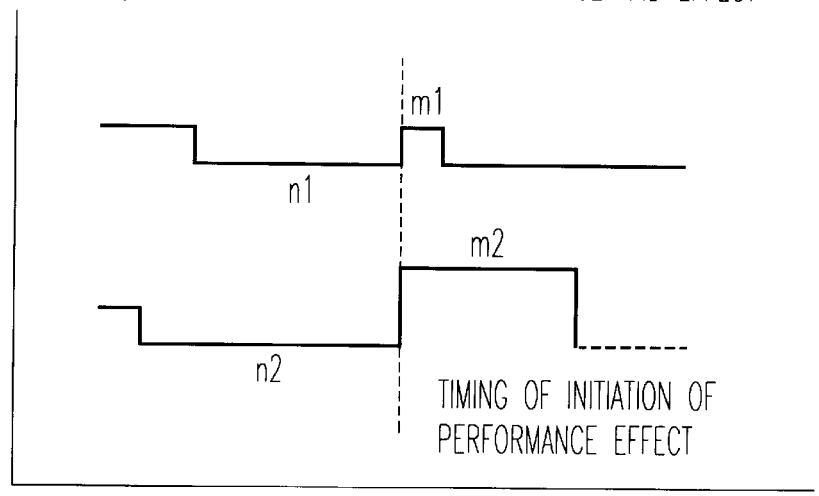
FIG. 15(b) is a time chart of performance effect control in the second example of the present invention.

In this operation, for example, as shown in FIGS. 14 and 15 (a), (b), the first n values of heart rate are collected as reference values, and m values are collected after a suitable timing in the current performance. In other words, the physiological signals from the physiological signal measuring means (26) are divided into two parts (n, m) by the signals from the performance effect control means at the timing of initiation of performance effect in order to detect the changes of heart rate and/or heart rate variability.

If a heart beat interval is ta=0.0143 min, a heart rate for this heart beat interval is 70. In this manner, heart rate is calculated for each heart beat, and the resulting number is written into the physiological signal determination memory (28) as a heart rate value. Likewise, heart rates are determined for n signals prior to the signal to be determined, i.e., from the last signal to nth last signal For more detail, if per minute-heart rates p1=70, p2=75, p3=68, p4=63, p5=70 are calculated from a series of heart beat intervals t1, t2, t3, t4, and t5, average value thereof is obtained as X=69.2 and also written into the physiological signal determination memory (28).

Then, heart rate pn is obtained from the next heart beat. For example, if pn=75, then p1 through p5 are respectively shifted to p1=75, p2=68, p3=63, p4=70 and p5=75 which is the newly calculated heart rate, and average heart rate X becomes X=70.2. The result of the calculation is written in the physiological signal determination memory (28), thereby successively renewing the written contents of the memory (28).

Basically, player's heart beat periods are continuously measured, and per minute-heart rates are calculated from inverse numbers of the measured heart beat periods. Then, n values prior to the datum to be determined, i.e., the last through nth last values are taken as data for reference values, and average and variability (such as standard deviation/square root of n)*M are obtained from these values. (M is a parameter to show accuracy required for determination, and written in the memory (28) based on the second status signal)

The heart rates obtained from the data to be determined are compared with these values to determine the mental state of the player who is playing the game. In other words, it is determined whether a change in player's heart rate is caused by a certain performance, for example, by comparing heart rate in the performance scene with heart rates in a predetermined period just prior to the change in the scene.

Specifically, when heart rate p=80 (m=1) is obtained from the next datum to be determined, the heart rate is compared with the reference values. For example, average value of "70.2", sample number of "5", standard deviation of "3", reliability of "95%" (M=2) results in a so-called normal range of "67.57" to "72.83" in accordance with the above-defined calculation formula. In this connection, if a value is within the range, the value is considered to be normal. When the heart rate p=80 is compared with the normal range, the heart rate p is found to exceed the maximum value of standard heart rate. Therefore, the player at this time is considered to be in a slightly excited state (in this case, in evaluation of degree of player's excitement, if degree of player's excitement is classified into 10 levels with respect to every 2 heart beats, then the above player's state may be evaluated as level 4 excessive excitement) (See Step S6 in FIG. 13.)

On the contrary, if heart rate p obtained from the next datum to be determined is p=65 (m=1), it is below the normal Therefore, the player is considered to be in a cool state. The physiological signal determination means (27) is set to indicate the result of the determination as a level specified with respect to degree of excitement and soberness, and sends the result of the determination to the performance effect controlling means (30) as a determination signal according to the level (See Step S7 in FIG. 13.)

In the above, the description has been made specifically with respect to the case where m=1. When the value of m is set to be greater, average of the last n values and average of the following m values are statistically tested (t-test, Welch test or the like) and compared for determination.

The physiological signal determination means (6) or (7) in the first example compares the calculated average heart rate with the pre-defined stationary reference value(s) to determine that the player is excited or cool when the calculated average heart rate is outside the predetermined range. On the other hand, in the second example, the normal range is dynamically modified based on the player's heart rates, thereby providing more proper evaluation of degrees of excitement or coolness.

Further, in the game or play facilities of the second example which are controlled by physiological information, the performance effect controlling means (30), on receiving the determination result, writes the result into the performance effect controlling memory (31), and controls the performance based on the determination result, for example, changes performances of the ongoing game so as to provide a more desired effect on the player.

When the player is considered to be excessively excited, the situation is regarded as "excessive performance". Then, operation is implemented for decreasing a number of characters or structural elements which appear or of background structural elements, for simplifying these items, for somewhat slowing down progress of the game, or for allotting slightly lighter tone to the background color, and based thereon, the performance of the game is controlled.

If the player is in a state of on the threshold level and interested in the progression of the game, for example, time for the current performance is prolonged. On the other hand, if it is considered that the player is not in a state of on the threshold level and not so interested in the progression of the game, control is implemented for changing the performance effect based on the determination, for example, for introducing other stimulants such as change in characters or events, or for reducing time for the current performance. The performance effect controlling means (30) transmits a control signal for this purpose to the computer (24).

The control command determined in the physiological signal controlling means (30) is the received by computer (24), where control is implemented for changing the progression of the game program (1) stored in the main memory (25).

In this example, the case has been described where situation to be reflected on controlling of the game performance (specific change in performance) is fed back as information to be reflected on the progress of the game with a certain period just before the event regarded as a period of a sub-scenario. However, a period from one scene performed in a period much shorter than the sub-scenario to the next scene may be regarded as such a certain period to feedback information based on these scenes to the physiological signal determination means (27) or the performance effect controlling means (30) as first and second condition signals, thereby implementing determination or control of the physiological signal.

In addition to the games or play facilities controlled by physiological information according to the above examples, the present invention may be realized as a "horror house" as the third example. A "horror house" is constructed such that various ghosts appear along a player's course. Some ghost can be extremely scary to children, but not so scary to adults. Further, it is considered that even if horror is aroused at first, the horror is likely to fade from repeated experiences.

In this example, the contents of the game (the course of the "horror house") are not changed, but physiological signals of each player are continuously collected. The collected physiological signals are compared at predetermined time intervals, and type and number of "ghosts" which appear or performance effectiveness by the appearances is changed when change examined by the comparison is large (excessive), thereby enabling situation controls to be effected in real time according to the players' physiological signals.

In other words, in the course of progression of the game program (1) stored in the main memory (25), the computer (24) controls performance effect by changing a situation in such a way that if it receives a "Insufficient performance" signal, for example, it introduces new characters, or that if it receives an "excessive performance" signal indicating high degree of player's excitement, it allots, in a horror scene, brighter tone to the background, or slows down the game progression, thereby providing more relaxation to the player.

These controls of performance effects by changing situations are executed in such a manner that sublogics are preliminarily incorporated in the main program as components, and these components stored in the memory (25) are read out according to control signals from the performance effect controlling means (30) and input in the computer (24) to modify progress of various scenes in a game scenario. Such a game development is shown on the display device (33) and provides the player with proper performance effects.

The game scenario is composed of certain number of sub scenarios. In development of one game story, for example, if its introductory part is adventurously entering a cavern, the game starts with a scene of the entrance of the cavern, which leads to numerous branched courses. The game is constructed such that the game development may be changed by choice of advance into a left or right course. Accordingly, a certain period in the game progress may be set as a sub-scenario period.

Figure 16:
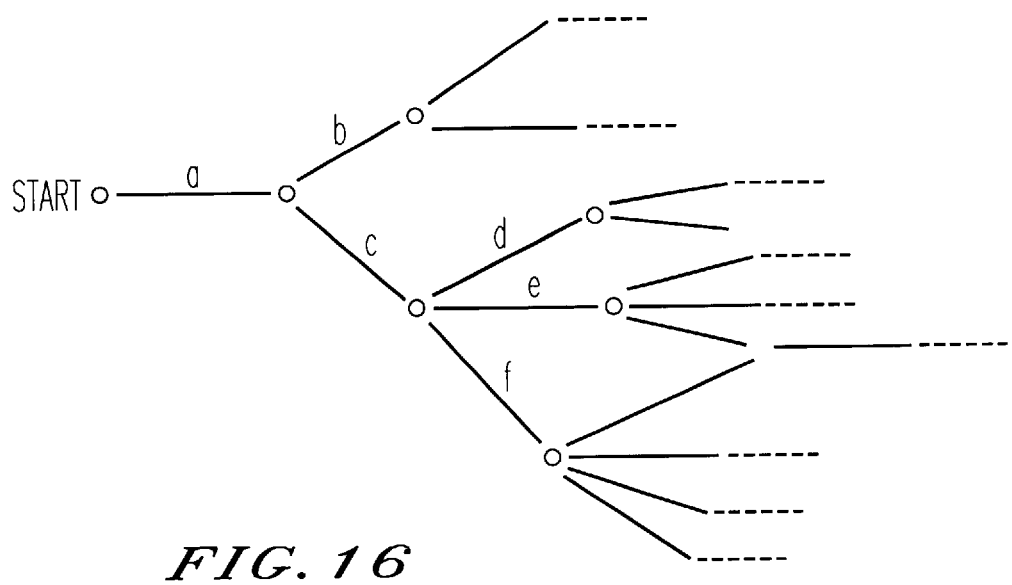
FIG. 16 is an explanatory diagram of the structure of the game scenario composed of sub-scenarios in the third example of the present invention.

Specifically, as shown in FIG. 16, the game starts with sub-scenario (a) and, on completion of the sub-scenario (a), progresses to the branched sub-scenario (b) or sub-scenario (c). To select the next sub-scenario, a status signal is fed back from the game progression monitor (34) to the performance effect controlling means (30) via the first status signal line (32), by considering player's status in a predetermined period just prior to the branch point at the end of sub-scenario (a) [in other words, a progression period of the sub-scenario (a)].

On receiving the fed back first status signal, the performance effect control means (30) reads out the predetermined period in the sub-scenario containing a check point (or check points) defined for each branch point, contents of control and parameters (m, n, M, and t) required for determination thereof. These are fed back to the physiological signal determination means (27) via the signal line (29), as the second status signal. On receiving the second status signal, the physiological signal determination means (27) writes (or overwrites) information necessary for determination contained in the second status signal, and from the memory (28) for physiological signal determination, reads out heart rate contained in the second status signal as physiological signal in the period Including check point for determination, and recalculates the determination result from the heart rate in this period. Thus the system obtains as many determination results as check points for determination.

Based on determination criteria defined for each branch point, the determination result(s) in the predetermined period contained in the second status signal is used for determining, for example, if player's mental state is such that the performance effect in the sub-scenario (a) is excessive and arouses high degree of excitement, or that the performance effect is insufficient and arouses not so much player's interest in the game progression. Then, the results of the determination are sent to the performance effect control means (30) before proceeding the next step, where modification of performance or the like is controlled.

For example, if the performance effect in the previous sub-scenario (a) is considered to be insufficient performance by the determination at the branch point, a more exciting scenario (one giving higher degree of fear or speed sensation) is chosen as the next sub-scenario form the branched sub-scenarios even if the current determination based on the heart rate currently obtained indicates "normal" mental state.

On receiving the determination result, the performance effect control means (30) determines control directions to select adequate sub-scenario among sub-scenarios (d) (excitement calmative scenario), (e) (moderate scenario), and (f) (excitement enhancing scenario). For example, the directions for controlling performance effect are such that when the mental state is at an excitement level of 1-3, "go to the excitement enhancing course", and when the mental state is at an excitement level of 4-6, "go to the moderate course" taking it as showing normal state of the player in the game progress, and when the mental state is at an excitement level of 7-10, "go to the calmative course" because of the player being at excessively excited state.

Such a control signal as above is transmitted to the computer (24), and, on receiving the control signal, the computer (24) decides the sub-scenario to be next performed among the sub-scenarios d, e and f, according to contents of the control signal.

As described above, the game or play facility in this example is adapted to be such that since player's physiological signals are ever-changing according to player's physical conditions even in the same player, a physiological signal detected just prior to the current performance is reflected on game progress control taking such fluctuation of the physiological signal into consideration, and may be reflected even on a scenario to provide scenario development most suitable for the player.

On the game progress monitor (34), indication may be so made as to enable the player to see the current position in the entire game scenario in the course of the progress of the game, and to see performance effects, ability, strength or belongings of characters as well Next, the fourth example will be described in which heart rate in a specific performance and that in a performance other than the specific performance are separately obtained and these are comparatively examined to check the effect of the specific performance, or the performance effect is compared with another one to determine whether the specific performance should be changed or not. Operation in this example is executed, for example, in the following operation procedure. For convenience of explanation of the operation, a game will be described as an example which comprises scene (1), scene (2), various intermediate scenes, scene (3), scene (4), various intermediate scenes, scene (5) and scene (6).

FIG. 17 is a diagram showing the game schematically. In FIG. 17, ci, cj and ck represent timings of change in performance which correspond to transitions of scenes. In this game, transitions are made at a predetermined timing ci from the scene (1) to the scene (2), and through the various intermediate scenes to the scene (3), and at a predetermined timing cj therefrom to the next scene (4), and through the various intermediate scenes to the scene (5), and at a predetermined timing ck to the scene (6).

Relative to each of the timings (ci etc.) of scene switching as a reference point, the preceding n data and the subsequent m data of heart rate are collected, and from the data, average values (HRn and HRm) and standard deviations (Sn and Sm) are obtained in accordance with a predetermined operation. Then, based on the average values, the standard deviations and a parameter (*M) to indicate accuracy required for determination, the difference between the two average values is statistically tested to obtain determination. The result is stored in association with the corresponding performance states.

The result enables determination effectiveness of the performance in the following manner. For example, difference between average of n data just prior to a certain ti timing and average of m data just subsequent to the certain timing ti is compared with a product of a measure of entire dispersion derived from standard deviations obtained from the n data and the m data multiplied by a certain number (M), thereby example whether the product is greater or smaller than absolute value of the difference between the averages. If the product is smaller than the absolute value, the situation is determined as being "non-effective". On the other hand, if greater, the situation is determined to be "effective (enhansive or calmative)". In this connection, whether the effect is enhancive or calmative may be determined by knowing the sign (to be positive or negative) in the absolute value, as in the following formula:

$$M \times \sqrt{\frac{Sn}{n} + \frac{Sm}{m}} \mathrel{\substack{< \\ > \\ =}} |HRm - HRn|$$

compare the value
(The value of $M$ is indicated by the performance effect control means)

Explanation will be given on a case of a story intended to relieve dislike of animals (snake). It is supposed that the story comprises the following scenes.

A0: You are lying in a tent in a campsite.
B0: A fox enters the tent.
B1: A snake enters the tent.
C0: A "fox fire" appears outside the tent.
D0: A "terrible fox woman" appears in the tent.
B2: Many snakes enter the tent.
B3: A big snake enters the tent.

It is supposed that on transition from the lying in tent-scene (A0) to the fox enters tent-scene (B0), the above-described determination of player's physiological information is "non-effective", and that on transition from the lying in tent-scene (A0) to the snake enters tent-scene (B1), the determination of the physiological information is "effective (enhancive)". It follows then that this player is found to have fear of snakes, but not of foxes.

As the next scene, a scene where the fox forces the snake off the tent is interposed. Then, transition from the lying in tent scene-(A0) to the snake enters tent-scene (B1) is repeated. If the determination result of the physiological information is "non-effective", it is understood that by the interposition of the "fox expels snake"-scene, the player no longer has fear of the snake in the presence of the fox in the tent with respect to the stimulation of the scene (B1).

Likewise, it is supposed that the determination results are "non-effective", effective (enhansive)" and "non-effective", respectively, in a case where the "fox fire" appears outside of the tent (C0) after the scene of lying in the tent (A0), a case where the "terrible fox woman" appears in the tent (D0) after the scene of "fox fire" appears outside the tent (C0), and a case where many snakes enter the tent (B2) after the scene of the "terrible fox woman" appears in the tent. Thereafter, If the player has already learned that the fox is combatting with the snake for some reason, the determination result becomes "effective (calmative)" even though the scene (B3) of a big snake enters the tent is inserted in the scene (D0) of a "terrible fox woman" enters the tent. This means that the player no longer feels fear of snake so much. Namely, it is understood that the same or similar scenes with entering of a snake cause different psychological effects on the player according to the position in the story.

Therefore, effect on the player is determined according to the difference in player's reaction (difference in determination) with respect to the same or similar scenes. For example, if the determination result is still "effective (enhansive)" in the previous example, another story can be presented that relieves the player's dislike of snakes. If the determination result is "non-effective" or "effective (calmative)", then the player's dislike of snakes is considered to have reduced, and selection of appropriate next scenes or sub-scenarios may be made, accordingly.

In this manner, scenes are switched taking player's reactions in the game into consideration.

The present invention incorporates physiological signal detection means to detect physiological signals of a player, mental state determination means that judges the player's mental state by comparing the physiological signal of the player, directly or after certain conversions, with proper reference values, and means for controlling game progression based on the results of the mental state determination; in this way the game can be controlled to provide the player more adequate contents by changing the course of the game story according to physiological information.

The present invention also incorporates arrangements to obtain reference values or measure its fluctuation from the real-time data for current player himself. This method automatically compensates for daily variations in physiological signals of the player, thus avoiding the necessity of initialization for each player and providing reliable way of judging performance effects of the game in the form of reference values.

Also, by recording heart rate during certain performance with information on the performance stage, the effect of individual performance effect can be continually monitored and compared with effects of other performance stages. Determining a reference value and allowance range from heart rate in the immediate past allows more reliable determinations not affected by fluctuations of a of signal.

Thus, the player can enjoy the game without being bothered by initializing procedures or excessive psychological stresses by key input operations.

What is claimed is:

1. A game or play facilities controlled by physiological information, the game or play facilities comprising:
   physiological signal measuring means for measuring a physiological signal of a player,
   mental state determination means for determining a mental state of the player by comparing the physiological signal with a reference value determined by a sequence of play or a game, and
   control means for controlling a contents of game progress of the game or play based on the mental state determined by the mental state determination means.

2. A game or play facilities capable of expressing a plurality of sequences, the game or play facilities comprising:
   physiological signal measuring means for measuring a physiological signal of a player,
   mental state determination means for determining a mental state of the player by comparing the physiological signal with a reference value determined by a sequence of play or a game, and
   sequence flow control means for controlling flow of sequences of the game or play based on the mental state determined by the mental state determination means.

3. A game or play facilities capable of expressing plural levels of performance effects, the game or play facilities comprising:
   physiological signal measuring means for measuring a physiological signal of a player,
   mental state determination means for determining a mental state of the player by comparing the physiological signal with a reference value determined by a sequence of play or a game, and
   performance effect control means for controlling performance effect of the game or play based on the mental state determined by the mental state determination means.

4. A game or play facilities capable of expressing a plurality of sequences and plural levels of performance effects, the game or play facilities comprising:
   physiological signal measuring means for measuring a physiological signal of a player,
   mental state determination means for determining a mental state of the player by comparing the physiological signal with a reference value determined by a sequence of play or a game,
   sequence flow control means for controlling flow of sequences of the game or play based on the mental state determined by the mental state determination means, and
   performance effect control means for controlling performance effect of the game or play based on the mental state determined by the mental state determination means.

5. The game or play facilities controlled by physiological information according to any one of claims 1 to 4, wherein the physiological signal of the player is one of a heart rate, a pulse wave, blood pressure, skin perspiration, epidermal vibration or a brain wave.

6. A game or play facilities controlled by physiological information, the game or play facilities comprising:
   physiological signal measuring means for repeatedly measuring heart beat information of a player;
   physiological signal determination means for calculating a reference value based on a plurality of repeated measurements of physiological information successively obtained by the physiological signal measuring means during a time period from a first time point to immediately before a second time point, where said first time point precedes said second time point by a predetermined time in a progression of a play or a game, for determining a state of the player at the second time point, and for comparing the reference value with the physiological information obtained after the second time point; and
   performance effect control means for instructing a performance change of the game or the play based on a result of a comparison from the physiological signal determination means,
   wherein the second time point corresponds to a branch time point of scenes switched by a control of the performance effect control means, and wherein the physiological signal determination means comprises:
   means for calculating a first mean value of m heart beat measurements successively obtained from the physiological signal measuring means during the time period, means for calculating a second mean value of m heart beat measurements successively obtained after the branch time point, and means for determining the state of the player after the branch time point by comparing the first and second mean values by a predetermined statistical examination.

7. A game or play facilities controlled by physiological information, the game or play facilities comprising:

physiological signal measuring means for repeatedly measuring heart beat information of a player;

physiological signal determination means for calculating a reference value based on 1) a mean value of n successive heart beat measurements obtained from the physiological signal measuring means in a progression of a game or a play, 2) a number of the n successive heart beat measurements, and 3) a parameter indicating an accuracy required for a determination, and for successively determining a state of the player by using the n heart beat measurements, the reference value, and the parameter indicating the accuracy required; and performance effect control means for instructing a performance change of the game or the play based on a result of the state of the player determined by the physiological signal determination means.

8. The game or play facilities controlled by physiological information according to claim 7, wherein the physiological signal determination means comprises:

means for calculating the reference value by using n heart beat measurements obtained during a time period between a first time point and a second time point, wherein the second time point is a predetermined time after the first time point in the progression of the game or the play, means for successively updating the reference value using a new heart beat measurement obtained after the second time point in place of an oldest one of the n heart beat measurements; and means for successively determining the state of the player after the second time point by comparing data successively obtained after the second time point with the reference value immediately before sampling the new heart beat measurement.

9. The game or play facilities controlled by physiological information according to claim 6 or claim 7, wherein the performance effect control means changes a performance time of a successively developed game or play.

10. The game or play facilities controlled by physiological information according to claim 6 or claim 7, wherein the performance effect control means comprises means for selecting one branch of plural scenario branches at a branch point after a currently progressing scene in the progression of the game or the play comprising differing branched scenarios.

11. A game or play facilities controlled by physiological information, the game or play facilities comprising:

physiological signal measuring means for repeatedly measuring physiological information of a player;

sub-scenario storing means for storing a plurality of sub-scenarios of a game or a play;

physiological signal determination means comprising means for providing a result of a determination including a reference showing a) a state of the player in each scene based on a plurality of measurements of the physiological information measured by the physiological signal measuring means during a time period from 1) a prior time point that is a predetermined time prior to a branch time point of the each scene of one of the sub-scenarios to 2) immediately before the branch time point and b) a plurality of measurements of the physiological information obtained time-sequentially by the physiological signal measuring means after the branch time point, means for storing the result of the determination at the each scene separately to a memory in association with the each scene, and means for determining an effectiveness with respect to the player at a current scene by comparing one of the result of the determination at a current one of the scenes with results of the determination at previous scenes; and performance effect control means for selecting subsequent scenes or the subsequent sub-scenario based on a result of determining the effectiveness from the physiological signal determination means.

12. The game or play facilities controlled by physiological information according to claim 11, wherein the physiological signal measuring means measures heart beat information, and wherein the means for providing comprises means for determining a state of the player at branch points by comparing a difference between 1) a mean value of n heart beat measurements obtained between the prior time point prior to the branch time point of each scene of a sub-scenario immediately before the branch time point and 2) a mean value of m heart beat measurements obtained after the branch time point, and for comparing a) the difference with b) a value calculated by multiplying 1) an accuracy parameter and 2) the square root of the sum of 2a) an unbiased variance calculated from the n heartbeat measurements and 2b) an unbiased variance calculated from the m heart beat measurements.

13. A game or play facilities controlled by physiological information, the game or play facilities comprising:

physiological signal measuring means for measuring a physiological signal of a player;

mental state determination means for determining a mental state of the player by comparing the physiological signal with a reference value determined by a level of performance; and control means for controlling contents of game progress of the game or play based on the mental state determined by the mental state determination means.

14. A game or play facilities capable of expressing a plurality of sequences, the game or play facilities comprising:

physiological signal measuring means for measuring a physiological signal of a player, mental state determination means for determining a mental state of the player by comparing the physiological signal with a reference value determined by a level of performance, and sequence flow control means for controlling flow of the sequences of the game or play based on the mental state determined by the mental state determination means.

15. A game or play facilities capable of expressing plural levels of performance effects, the game or play facilities comprising:

physiological signal measuring means for measuring a physiological signal of a player, mental state determination means for determining a mental state of the player by comparing the physiological signal with a reference value determined by a level of performance, and performance effect control means for controlling performance effect of the game or play based on the mental state determined by the mental state determination means.

16. A game or play facilities capable of expressing a plurality of sequences and plural levels of performance effects, the game or play facilities comprising:

physiological signal measuring means for measuring a physiological signal of a player, mental state determination means for determining a mental state of the player by comparing the physiological signal with a reference value determined by a level of performance, sequence flow control means for controlling flow of the sequences of the game or play based on mental state determined by the mental state determination means, and performance effect control means for controlling performance effect of the game or play based on the mental state determined by the mental state determination means.

17. The game or play facilities controlled by physiological information according to any one of claims 13 to 16, wherein the physiological signal of the player is one of a heart rate, a pulse wave, blood pressure, skin perspiration, epidermal vibration or a brain wave.

* * * * *